United States Patent [19]
Idbeis

[11] Patent Number: 5,535,702
[45] Date of Patent: Jul. 16, 1996

[54] AQUARIUM SEA CURRENT GENERATOR

[76] Inventor: Badr Idbeis, 9012 Windwood St., Wichita, Kans. 67226

[21] Appl. No.: 415,198

[22] Filed: Apr. 3, 1995

[51] Int. Cl.[6] ............................ A01K 63/00; A47K 3/10
[52] U.S. Cl. ................... 119/247; 4/491; 405/79; 119/249
[58] Field of Search .............. 405/79; 119/245, 119/247, 249–251, 269; 4/491

[56] References Cited

U.S. PATENT DOCUMENTS

| | | | |
|---|---|---|---|
| 4,467,483 | 8/1984 | Bastenhof | 4/491 |
| 4,515,500 | 5/1985 | Bastenhof | 405/79 |
| 4,522,535 | 6/1985 | Bastenhof | 405/79 |
| 4,539,719 | 9/1985 | Schuster et al. | 405/79 |
| 4,812,077 | 3/1989 | Raike | 405/79 |
| 5,098,222 | 3/1992 | Robinson | 405/79 |
| 5,226,747 | 7/1993 | Wang et al. | 405/79 |
| 5,285,538 | 2/1994 | Long | 405/79 |
| 5,467,739 | 11/1995 | Boschert | 119/247 |

FOREIGN PATENT DOCUMENTS

| | | | |
|---|---|---|---|
| 2004528 | 8/1971 | Germany | 4/491 |
| 2461852 | 7/1976 | Germany | 119/245 |

*Primary Examiner*—Hoang C. Dang
*Attorney, Agent, or Firm*—Edward L. Brown, Jr.

[57] ABSTRACT

A sea current generator aquarium including an air-tight water chamber located at one end of the aquarium with an opening into the aquarium extending across the bottom of the chamber. A constant flow air pump connected to the top of the water chamber for pumping air therein and expelling water therefrom out of said opening into the aquarium and an air valve positioned in an duct connecting the top of the water chamber to atmosphere in an actuating means for cycling the air valve from an opened to a closed position whereby in its opened position, the air valve and duct exceed the capacity of the pump and allow the elevated water column in the aquarium to move back into the water chamber through said opening until the water level is stabilized and thereby creating a back and forth current of water within the bottom regions of the aquarium.

8 Claims, 1 Drawing Sheet

AQUARIUM SEA CURRENT GENERATOR

BACKGROUND OF THE INVENTION

The present invention relates to aquariums and more specifically to a sea current generator in an aquarium which simulates the back and forth currents present in a tropical reef, well below the surface of the water. With these gentle back and forth currents in the bottom of the aquarium, a more realistic environment is provided for the growth of various underwater plants and sea life.

PRIOR ART

To prevent stagnation and formation of algae in an aquarium of this type, small continuous flow pumps have been used to provide water movement within the aquarium. However, the areas of movement have been localized and multiple pumps have been required which still don't provide uniform movement through the aquarium.

The closest apparatus to a sea current generator would be various types of wave generators which are typically used in pools in water parks to generate a wave of substantial size for surfing and enjoyment of persons in the pool. This type of apparatus generates a sizable surface wave at a frequency simulating the ocean surf. A example of this type of apparatus is illustrated in Robinson, U.S. Pat. No. 5,098,222 wherein a positive water head is released from a chamber into a pool to create a wave which rolls across the surface of the pool. The water discharged in this apparatus is at the top of the tank rather than the bottom and it utilizes a positive head rather than a negative head to create the wave.

The patent to Bastenhof, U.S. Pat. No. 4,522,535, illustrates another way of generating a surface wave in a surfing pool. This system is somewhat the reverse of the present invention in that it blows positive high pressure air into the chamber to create a surface wave through a relatively complex structure which includes numerous valves, a 500 psi air compressor and a storage reservoir for that pressure.

Bastenhof, U.S. Pat. No. 4,467,483, teaches a similar wave generator structure again with the reverse operation to that of the present invention with blowing air pressure into the chamber to create a wave. In the patent to Raike, U.S. Pat. No. 4,812,077, the same reverse operation takes place. The wave is created by a blower with mechanical air valves to charge and vent the alternate chambers, similar to the previously-mentioned Bastenhof patents. This patent, along with the ones mentioned above are intended to create a surface wave in a pool and have no concern for the subsurface water movement.

Not only do the last three mentioned patents use the expiration stage of the chamber to form the wave but they also require a positive valving for the aspiration cycle which the present invention does not since it merely uses the positive head differential in the aquarium to refill the pressure chamber. The air pump of the present invention requires only a single valve which vents the pressure chamber once the negative head is created in the water chamber. Other types of wave generators are known which include movable vertical walls in a pool which move horizontally back and forth to create a wave. These types of devices require substantial energy to operate and very complex structure to maintain and operate.

BRIEF DESCRIPTION OF THE INVENTION

The sea current generator of the present invention involves a relatively simple structure which utilizes a pressure chamber at one end of an aquarium which has a sufficient volume in the pressure chamber relative to the overall volume of the aquarium so as to create a gentle back and forth water current action in the aquarium so as to simulate the moving water conditions in a tropical reef. This back and forth current movement stimulates the growth activity of various plants and organism which exist in the reef. The current generator includes a pressure chamber positioned in one end of the aquarium having an opening into the aquarium which extends across the bottom of the aquarium from side to side. The pressure chamber is supplied by constant flow air pump which will evacuate the pressure chamber when the control valve for venting the pressure chamber is in a closed position. The control valve, also referred to as vent valve or dump valve, has a capacity far exceeding the output of the pump and when it is in the open position the air pressure in the chamber is basically atmospheric. The control valve, which is actuated by a rotary solenoid, is controlled by a timer which opens the valve when a sufficient negative head has been created in the pressure chamber. The venting of the pressure chamber creates an immediate rush of water from the aquarium into the pressure chamber as the water head and the pressure chamber equalizes with that of the aquarium. This rushing water into the pressure chamber creates a light current across the bottom of the aquarium at a similar frequency to the actual current movement in ocean reefs. Once the water levels in the pressure chamber are equalized, the timer closes the vent valve and the pump again begins to pump the water from the pressure chamber and again create a negative pressure head in the pressure chamber. Once that head is again reached, the timer opens the vent valve and the cycle is repeated. This very simplified system involves a single pneumatic valve and air pump and requires only a single phase while the above-mentioned Bastenhof patents basically require a two phase system with twice the valves and hardware and lastly are concerned with formulating a surface wave rather than a back-and-forth sea current action.

It is therefore the principal object of the present invention to provide a sea current generator which simulates a constant back-and-forth gentle current across bottom regions of an aquarium at a previously determined frequency.

DETAILED DESCRIPTION OF THE INVENTION

Figure 1:
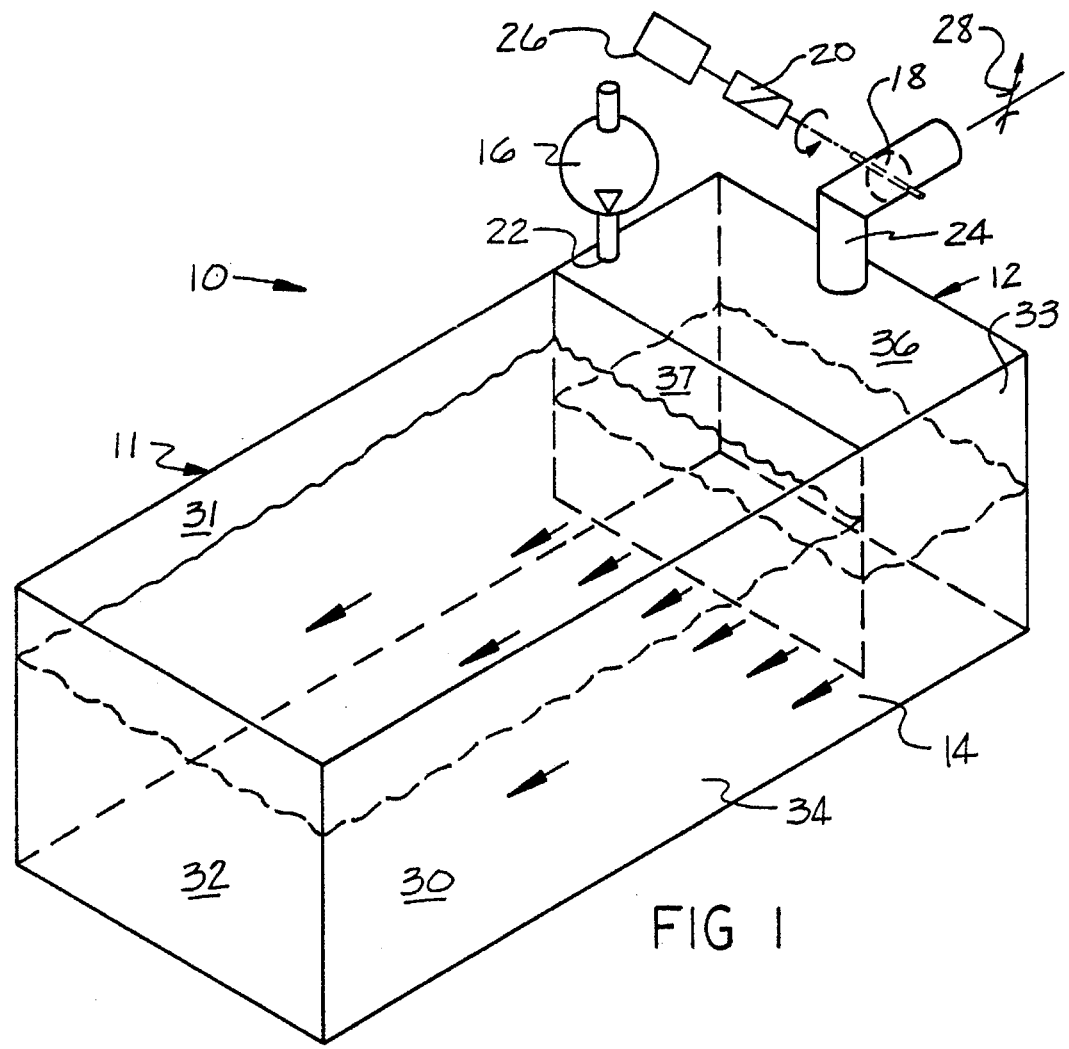
FIG. 1 is a perspective view of the present invention in an aquarium symbolically represented.

The aquarium sea current generator of the present invention is generally described by reference numeral 10 and is shown symbolically in FIG. 1 of the drawings. The aquarium 11 includes a pair of side walls 30 and 31, a pair of end walls 32 and 33 and a bottom 34. Located in the right end of the aquarium 11, as seen in the drawings, is a pressure chamber 12 which extends across one end of the aquarium. The chamber 12 is a pressure chamber formed by a top wall 36 and side wall 37 along with the side and end walls 30, 31 and 33, respectively, of the aquarium. Extending across the bottom of the chamber 12 is an opening 14 which extends laterally across the aquarium from side to side in uniform height, opening the pressure chamber 12 into the rest of the aquarium 11. Connected to the pressure chamber 12 is a low pressure blower or air pump 16 which connects to the chamber through port 22. Also connected to chamber 12 is a large diameter duct 24 which includes a butterfly valve 18 for venting the pressure chamber. The CFM capacity of the valve 18 far exceeds that of pump 16. The rate of air flow through duct 24 can be adjusted by a variable orifice valve 28 symbolically shown in FIG. 1. Valve 18 is a conventional butterfly type valve actuated by a rotatory solenoid 20 which in turn is energized by a control timer 26 symbolically shown. Other types of valves with linear actuators could also be used.

The pressure chamber 12 can be separately constructed and placed in the end of a conventional aquarium or it can be constructed as an integral part of the aquarium utilizing the existing walls and bottom of the aquarium with the added top wall 36 and side wall 37. The location of the air port 22 for the pump 16 and the vent 24 only require that they be positioned above the maximum water level in the pressure chamber at all times.

OPERATION

Figures 2, 3:
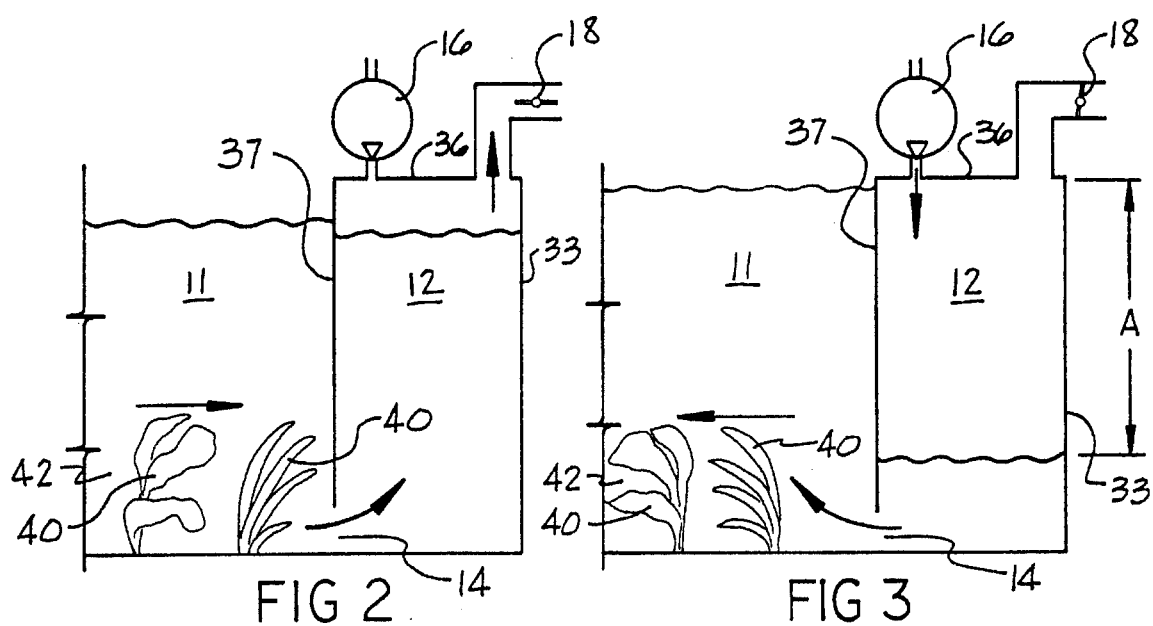
FIG. 2 is symbolic side elevational view of a portion of the aquarium and pressure chamber in the fully vented position.
FIG. 3 is a similar side elevational view to FIG. 2 with the water levels in the fully expirated position.

The pump 16 can be any type of centrifugal blower or pump which runs constantly while the sea current generator 10 is in operation. The aquarium 11 normally has an open top as illustrated in FIGS. 2 and 3. However, it could also have a vented closed top.

When the current generator 10 is initially started, the pump 16 begins to pump air into chamber 12 while butterfly valve 18 is in its closed position, as seen in FIG. 3. As the water level is pumped down in chamber 12, the water flows from chamber 12 into the aquarium 11 as indicated by the arrows in FIGS. 1 and 3. When the water level in chamber 12 reaches its optimum negative head A, as indicated in FIG. 3, the butterfly valve 18 is opened through an electrical signal generated by a timer 26 which fires solenoid 20. Since the venting capacity of duct 24 far exceeds the capacity of pump 16 the air pressure in chamber 12 drops to atmospheric and the negative pressure head in chamber 12 causes the water in the aquarium 11 to rush back into chamber 12 through opening 14 along the bottom regions 42 of the aquarium. Based on the rate of airflow through butterfly valve 18, a control timer 26 will de-energize solenoid 20 approximate the time the water levels in the pressure chamber 12 and aquarium 11 equalize, as illustrated in FIG. 2. As solenoid 20 is deenergized, butterfly valve 18 closes and positive pressure is created in chamber 12 forcing the water level downwardly and back into aquarium 11. This back and forth current in the lower regions 42 of the aquarium creates a beneficial action on the plant life 40 in the aquarium so as to assimilate the sea currents in a reef. The amplitude or volume of the water moved and the frequency of the current can be adjusted by the settings of the timer 26 and the flow rate in the duct 24. The comparative volumes of the chamber 12 to the aquarium 11 can vary; however, an optimum ratio of ranges would be a pressure chamber between 15 and 25 per cent by volume of the aquarium. The velocity of the current is normally greater as the water returns to the pressure chamber 12 from that of expelling water from the chamber 12. However, both can be varied. The frequency of the reversing currents can be adjusted to whatever is desired. The size of opening 14 which extends across the entire width of the aquarium is relatively large so that the time intervals for the suction stroke of chamber 12 is relatively unchanged with varying heads of water. The velocities created in opening 14 are sufficient to create movement across the full length of the aquarium from end to end.

The timing control 26 can be set to cycle the valve open and closed for a range of time intervals, tailored to the size of the aquarium. An aquarium 4 feet in length typically would cycle the valve 18 open for 2 seconds and then closed for 2 seconds. If desired, the closing time can exceed the open time, depending upon the conditions.

The sea current generator is relatively simple in design and operation and has sufficient flexibility for adjusting velocities of the current throughout the aquarium to achieve the optimum aquarium environment for flora and fauna.

It is to be understood that while certain forms of the present invention have been illustrated and described herein, it is not to be limited to the specific forms or arrangement of parts described and shown.

I claim:

1. An aquarium having two side walls, a bottom and two end walls, a sea current generator comprising:

an airtight water chamber located in one end of the aquarium including a top, the water chamber including an opening into the aquarium extending across the bottom from one side to the other, the water chamber otherwise being enclosed and including a constant flow air pump means connected to the top of the water chamber for pumping air into said chamber and expelling water therefrom to elevate the water column in the aquarium and air valve means in a duct connecting the water chamber to atmosphere and actuating means for cycling the air valve from an open to a closed position whereby in its open position the air valve and duct exceed the capacity of the constant flow air pump and allows the elevated water column in the aquarium to move back into the water chamber through the said opening until the water levels stabilize, thereby creating a back-and-forth current of water within the bottom regions of the aquarium.

2. An aquarium as set forth in claim 1, including adjustable timing means which signals the actuating means to open and close the valve means to adjust the frequency of the back-and-forth current within the aquarium.

3. An aquarium as set forth in claim 1 wherein the opening in water chamber is sufficiently small so that as the water is pumped out of the water chamber, there is a gentle water current extending the full length of the aquarium.

4. An aquarium with side walls and a bottom including a sea current generator comprising:

an airtight water chamber positioned in the aquarium;

an opening in the water chamber located at the bottom of the aquarium and extending the full width of the aquarium;

an air pump means connected to said water chamber for pumping air into said chamber and expelling water therefrom to eliminate the water column in the aquarium;

an air valve positioned in a duct connecting the water chamber to atmosphere;

actuating means for cycling the air valve from an open to a closed position whereby in its open position the air valve exceeds the capacity of the air pump and allows the elevated water column in the aquarium to move back into the water chamber through said opening until the water levels stabilize, creating a back-and-forth current of water in the aquarium.

5. An aquarium as set forth in claim 4 wherein the air valve is a butterfly valve and the actuating means is a rotary solenoid.

6. An aquarium as set forth in claim 4 including timing means which signals the actuating means to open and close the valve.

7. An aquarium as set forth in claim 4 including a control timer connected to the actuating means which is capable of adjusting the timing cycle of the air valve.

8. An aquarium with side walls and a bottom including a sea current generator comprising:

an airtight water chamber positioned in the aquarium;

an opening in the water chamber located at the bottom of the aquarium opening a flow path extending the length of the aquarium;

an air pump connected to said water chamber for pumping air into said chamber and expelling water therefrom to elevate the water column in the aquarium;

an air valve positioned in a duct connecting the water chamber to atmosphere;

an electrical solenoid connected to the air valve for cycling the air valve from an open to a closed position whereby in its open position the air valve exceeds the capacity of the air pump and allows the elevated water column in the aquarium to move back into the water chamber through said opening until the water levels stabilize, creating a back-and-forth current of water in the aquarium.

* * * * *